United States Patent
Zhang et al.

(10) Patent No.: US 12,072,276 B2
(45) Date of Patent: Aug. 27, 2024

(54) ONLINE MEASUREMENT DEVICE FOR CRYSTAL SIZE AND SHAPE IN HIGH-SOLID-CONTENT CRYSTALLIZATION PROCESS

(71) Applicant: Qingdao University of Science and Technology, Qingdao (CN)

(72) Inventors: Fangkun Zhang, Qingdao (CN); Zidong Ai, Qingdao (CN); Bing Wu, Qingdao (CN); Baoming Shan, Qingdao (CN)

(73) Assignee: QINGDAO UNIVERSITY OF SCIENCE AND TECHNOLOGY, Qingdao (CN)

( * ) Notice: Subject to any disclaimer, the term of this patent is extended or adjusted under 35 U.S.C. 154(b) by 307 days.

(21) Appl. No.: 17/775,901

(22) PCT Filed: Nov. 8, 2021

(86) PCT No.: PCT/CN2021/129276
§ 371 (c)(1),
(2) Date: May 11, 2022

(87) PCT Pub. No.: WO2022/105632
PCT Pub. Date: May 27, 2022

(65) Prior Publication Data
US 2023/0152205 A1    May 18, 2023

(30) Foreign Application Priority Data
Nov. 18, 2020    (CN) .......................... 202011291265.3

(51) Int. Cl.
*B01D 9/02*    (2006.01)
*B01D 9/00*    (2006.01)
(Continued)

(52) U.S. Cl.
CPC ....... *G01N 15/1434* (2013.01); *B01D 9/0063* (2013.01); *B01D 9/0077* (2013.01);
(Continued)

(58) Field of Classification Search
CPC .......... G01N 15/1434; G01N 15/1404; G01N 2015/1493; G01N 2015/1497; B01D 9/0063; B01D 9/0077; B01D 2009/0086
See application file for complete search history.

(56) References Cited

FOREIGN PATENT DOCUMENTS

| CN | 101788464 A | 7/2010 |
|----|-------------|--------|
| CN | 103558129 A | 2/2014 |

(Continued)

OTHER PUBLICATIONS

Zhenguo Gao, et al., Recent Developments in the Crystallization Process: Toward the Pharmaceutical Industry, Engineering, 2017, pp. 343-353, vol. 3.
(Continued)

*Primary Examiner* — Robert M Kunemund
(74) *Attorney, Agent, or Firm* — Porus IP LLC

(57) ABSTRACT

An online measurement device for crystal size and shape in a high-solid-content crystallization process includes a solution amplifier, a measurement device, a peristaltic pump, a crystallization kettle, a dilution device and a solution storage tank. A crystal-containing solution is arranged in the crystallization kettle; an inner wall of the solution amplifier is smooth, one end is an amplification end, and the other end is a contraction end. The contraction end is communicated with one end of the solution storage tank and one end of the crystallization kettle. The amplification end is communicated with the dilution device and the peristaltic pump. The peristaltic pump is communicated with the other end of the crystallization kettle. The solution amplifier, the peristaltic pump and the crystallization kettle form a complete passage
(Continued)

through a pipeline. A measurement instrument of the measurement device is arranged at the outer side of the solution amplifier.

10 Claims, 3 Drawing Sheets

(51) Int. Cl.
    *G01N 15/1404*     (2024.01)
    *G01N 15/1434*     (2024.01)
    *G01N 15/14*     (2006.01)

(52) U.S. Cl.
    CPC . *G01N 15/1404* (2013.01); *B01D 2009/0086* (2013.01); *G01N 2015/1493* (2013.01); *G01N 2015/1497* (2013.01)

(56) References Cited

FOREIGN PATENT DOCUMENTS

| | | | |
|---|---|---|---|
| CN | 110160919 A | | 8/2019 |
| CN | 110243825 A | | 9/2019 |
| CN | 112485165 A | | 3/2021 |
| EP | 1245951 B1 | * | 1/2012 ........... B01D 9/0063 |
| JP | H01321335 A | | 12/1989 |
| JP | 2000225302 A | | 8/2000 |
| JP | 2003268363 A | * | 9/2003 |

OTHER PUBLICATIONS

Heike Lorenz, et al., Industrial Crystallization: Classical Technology with Steadily Increasing Applications and Importance, Chem. Eng. Technol., 2017, pp. 1210, vol. 40, No. 7.

Xue Z. Wang, et al., Crystal growth measurement using 2D and 3D imaging and the perspectives for shape control, Chemical Engineering Science, 2008, pp. 1173-1184, vol. 63.

Zoltan K. Nagy, et al., Recent advances in the monitoring, modelling and control of crystallization systems, Chemical Engineering Research and Design, 2013, pp. 1903-1922, vol. 91.

Dejiang Zhang, et al., Optimization of cooling strategy and seeding by FBRM analysis of batch crystallization, Journal of Crystal Growth, 2018, pp. 1-9, vol. 486.

Fangkun Zhang, et al., Seed Recipe Design for Batch Cooling Crystallization with Application to L-Glutamic Acid, Ind. Eng. Chem. Res., 2019, pp. 3175-3187, vol. 58.

David R. Ochsenbein, et al., Growth Rate Estimation of β L-Glutamic Acid from Online Measurements of Multidimensional Particle Size Distributions and Concentration, Ind. Eng. Chem. Res., 2014, pp. 9136-9148, vol. 53.

Stefan Schorsch, et al., Measuring multidimensional particle size distributions during crystallization, Chemical Engineering Science, 2012, pp. 130-142, vol. 77.

* cited by examiner

ONLINE MEASUREMENT DEVICE FOR CRYSTAL SIZE AND SHAPE IN HIGH-SOLID-CONTENT CRYSTALLIZATION PROCESS

CROSS-REFERENCE TO THE RELATED APPLICATIONS

This application is the national stage entry of International Application No. PCT/CN2021/129276, filed on Nov. 8, 2021, which is based upon and claims priority to Chinese Patent Application No. 202011291265.3, filed on Nov. 18, 2020, the entire contents of which are incorporated herein by reference.

TECHNICAL FIELD

The present invention relates to the technical field of online measurement in industrial crystallization, in particular to an online measurement device for crystal size and shape in a high-solid-content crystallization process.

BACKGROUND

As an important means for separation and purification, crystallization technique is widely applied in pharmaceutical industry, chemical industry, food industry and other industries (Z. Gao, et al. Engineering, 2017. 3:343-353; H. Lorenz, et al. Chem. Eng. Technol., 2017. 40:1210). The existing methods for measuring the shape and size distribution of crystal in a crystallization process mainly include FBRM, laser particle size analyzer, ultrasonic method and image method, among which the crystal shape is mainly measured by an online image method (Xue Z. Wang, Crystal growth measurement using 2 D and 3 D imaging and the perspectives for shape control. Chemical Engineering Science 0.2008). However, the literature (Nagy et. al., Recent advances in the monitoring, modelling and control of crystallization systems, Chemical Engineering Research and Design. 2013) states that it is already difficult to apply the image method to the measurement crystals in a crystallization process due to crystal overlap and worse transmittance in solution when a solid content of a crystalline solution exceeds 8%-10%.

The existing online measurement methods for crystal shape and particle size distribution are roughly divided into three types depending on measurement positions: immersed, in-situ and external-circulating. The immersed measurement method is mainly represented by FBRM (Zhang et. al., Optimization of cooling strategy and seeding by FBRM analysis of batch crystallization. Journal of Crystal Growth. 2018), and includes the following steps: immersing a probe into a crystallization kettle and measuring a chord length of crystal. This measurement mode tends to cause the crystal growing on the probe, and the probe will destroy the hydrodynamic characteristics of the crystallization kettle. In addition, measurement results are affected by such problems as easy blockage of some crystallization systems and probe corrosion. An in-situ measurement device (Zhang et. al., Seed recipe design for batch cooling crystallization with application to L-glutamic acid. Ind. Eng. Chem. Res. 2019) mainly realizes the measurement of a crystal shape and CSD by placing a light source and a camera at the outer side or both sides of a crystallization kettle and focusing them in a reactor. At present, this method is mainly used for laboratory investigation of a system applicable to a low concentration crystal content and is difficult to apply to a high-solid-content crystalline solution. Also, there are the problems of crystal blur, overlap and pseudo-adhesion in most of measured crystallization images, so it is difficult to obtain an accurate crystal shape and size distribution. An external-circulating measurement method (Ochsenbein et. al., Growth rate estimation of B-L-glutamic acid from online measurements of multidimensional particle size distributions and concentration. Ind. Eng. Chem. Res. 2013; Schorsch et. al., Measuring multidimensional particle size distributions during crystallization. Chemical Engineering Science. 2012) is developed in recent years, which is mainly used to measure crystal in a pipeline based on a circulation pipeline through online images. This mode has the characteristic that the integrity is not affected by sampling measurements, but also has the disadvantages of pipeline blockage due to crystal growth on a pipeline wall, sedimentation and the like.

Thus, it is urgent to design an online measurement device suitable for a crystalline solution with a solid content of higher than 10% in a crystallization process, which is capable of solving the problems of difficult online measurement of the crystal shape and size distribution due to a too high crystal content in an industrial crystallization process.

SUMMARY

The present invention is intended to provide an online measurement device for crystal size and shape in a high-solid-content crystallization process to solve the above-mentioned problems existing in the prior art. The online measurement device is capable of effectively solving the problem of difficult online measurement of the crystal shape and size distribution due to a too high crystal content in an industrial crystallization process.

In order to achieve the above-mentioned purpose, the present invention provides the following solution: the present invention provides an online measurement device for crystal size and shape in a high-solid-content crystallization process, including a solution amplifier, a measurement device, a peristaltic pump, a crystallization kettle, a dilution device and a solution storage tank, wherein a crystal-containing solution is arranged in the crystallization kettle; an inner wall of the solution amplifier is smooth, one end is an amplification end, and the other end is a contraction end; identical through holes are formed in middle parts of both ends of the solution amplifier, and the solution amplifier is communicated with a pipeline by the through holes;

the contraction end of the solution amplifier is communicated with one end of the solution storage tank and one end of the crystallization kettle respectively; the amplification end of the solution amplifier is communicated with the dilution device and the peristaltic pump respectively; the peristaltic pump is communicated with the other end of the crystallization kettle; the solution amplifier, the peristaltic pump and the crystallization kettle form a complete passage through a pipeline; a measurement instrument of the measurement device is arranged at the outer side of the solution amplifier and focuses on the solution in the amplification end of the solution amplifier; and at least one stop valve is mounted on each branch of the pipeline.

Further, the present invention is a mode based on external-circulating online measurement, i.e., non-contact measurement, and components in the measurement device are not affected by media characteristics and corrosivity; moreover, the present invention is designed for the measurement of a crystalline solution with a solid content of higher than 10%, and in the prior art, no accurate measurement mode is available for crystalline solutions with high solid content in the industry.

Further, a high-solid-content solution is diluted through the dilution device and measured at the solution amplifier; one stop valve is arranged on each branch of the pipeline to control the connection and disconnection of the pipeline; and a flow rate of the crystal-containing solution is controlled by the peristaltic pump.

Further, the solution storage tank plays the role that when a diluent is different from a solvent of the crystalline solution, the crystalline solution is measured by directly discharging the diluted crystalline solution to the solution storage tank to prevent the diluted crystalline solution from flowing back to the crystallization kettle and contaminating the solution in the crystallization kettle.

The amplification end of the solution amplifier is of a cylindrical structure, and the contraction end of the solution amplifier is of a funnel structure; a transition from the amplification end to the contraction end of the solution amplifier is smooth; a cross section of a small end of the contraction end of the solution amplifier is identical to a cross section of the through hole.

A constant-temperature tank in a shape suitable for the solution amplifier is arranged at the outer side of the solution amplifier; a constant temperature in the constant-temperature tank is maintained at a level not higher than the temperature in the crystallization kettle; the solution amplifier is made of a high-transmittance material; and the constant-temperature tank is made of a high-transmittance material or provided with a high-transmittance window.

Further, the solution temperature in the constant-temperature tank is maintained at the same level as that in the crystallization kettle or above 1-2° C.

A thermal insulation layer is arranged at the outer side of the pipeline; both a feeding end and a discharging end of the pipeline are immersed into the crystal-containing solution; and the inner wall of the pipeline is smooth.

Preferably, crystallization of the crystal-containing solution in the pipeline and the solution amplifier due to temperature variations during circulation can be prevented through the thermal insulation settings of the constant-temperature tank and the thermal insulation layer, and the problem of pipeline blockage will be produced due to excessive crystallization is avoided. Thus, the thermal insulation settings greatly reduce a disturbing influence of solution temperature variations in the circulation pipeline on the crystallization systems.

Further, the solution amount in the whole pipeline is not higher than ⅕ of the volume of the pipeline.

A stirrer and a temperature sensor are also inserted into the crystallization kettle; one end of the stirrer and one end of the temperature sensor are immersed in the crystal-containing solution, and the other end of the stirrer and the other end of the temperature sensor extend from an inner cavity of the crystallization kettle.

The measurement device also includes a master control center, wherein the master control center is electrically connected with the measurement instrument, stirrer and temperature sensor.

The measurement instrument includes, but is not limited to, an online image system and a laser particle size analyzer.

Preferably, the instrument of the device has a variety of functions that it measures not only the particle size distribution of crystal online but also the crystal morphology.

The dilution device includes a mixer, a diluent storage tank and a driving pump, wherein the mixer is mounted on the pipeline between the amplification end of the solution amplifier and the peristaltic pump and successively communicated with the driving pump and the diluent storage tank through the pipeline.

Further, the driving pump may be a centrifugal pump, a positive displacement pump or a peristaltic pump.

Further, the flow rate of diluent is controlled by the driving pump.

Diluent in the diluent storage tank is a solution different from the crystal or the same saturated solution as the crystal-containing solution; and the mixer is a static mixer.

The solid content of the crystal-containing solution after being mixed by the mixer is not higher than 10%.

The present invention discloses the following technical effects: the present invention realizes the measurement of a crystalline solution with a solid content of higher than 10%, and overcomes the problem that it is difficult to measure a crystalline solution with a solid content of higher than 10% by the existing measurement methods; through the design of the pipeline thermal-insulation layer and the constant-temperature tank, the problem of pipeline blockage caused by solution crystallization on the pipe wall and crystal sedimentation are avoided, and the disturbing influence of solution temperature variations in the circulation pipeline on the crystallization system is greatly reduced; the device measures not only the particle size distribution of crystal online but also the crystal morphology; the present invention allows both continuous measurement and intermittent measurement; the present invention not only realizes the recycling of a crystalline solution, but also discharges a measured solution for storage.

BRIEF DESCRIPTION OF THE DRAWINGS

In order to describe the technical solution in the embodiments of the present invention or in the prior art more clearly, the accompanying drawings to be used in the embodiments will be introduced briefly below. Obviously, the accompanying drawings described below are only some of the embodiments of the present invention. For those of ordinary skill in the art, other drawings can also be obtained based on these drawings without making creative efforts.

Figure 1:
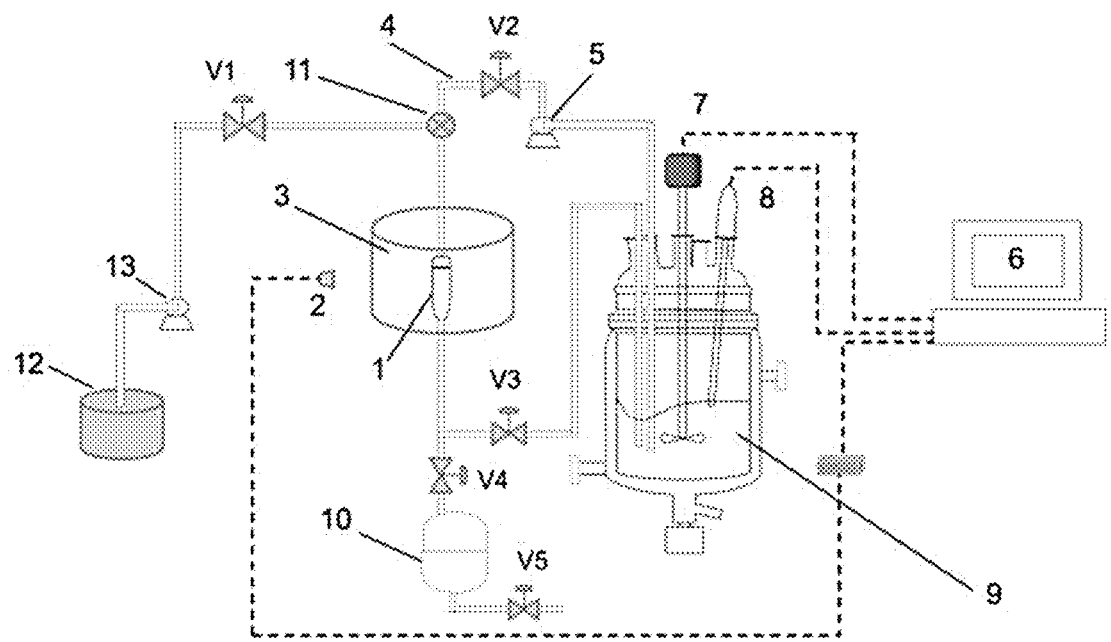
FIG. 1 is a structural view of the present invention.

In the figures: 1. solution amplifier; 2. measurement device; 3. constant-temperature tank; 4. pipeline; 5. peristaltic pump; 6. master control center; 7. stirrer; 8. temperature sensor; 9. crystallization kettle; 10. solution storage tank; 11. mixer; 12. diluent storage tank; 13. driving pump.

DETAILED DESCRIPTION OF THE EMBODIMENTS

The technical solution in the embodiments of the present invention will be clearly and completely described below in combination with the accompanying drawings in the embodiments herein. Obviously, the embodiments described are only part of, rather than all of, the embodiments of the present invention. Based on the embodiments in the present invention, all other embodiments obtained by those of ordinary skill in the art without making creative efforts should fall within the protection scope of the present invention.

In order to make the above-mentioned purposes, characteristics and advantages of the present invention more obvious and understandable, the present invention will be described in further detail below in conjunction with the accompanying drawings and preferred embodiments.

The present invention provides an online measurement device for crystal size and shape in a high-solid-content crystallization process, including a solution amplifier 1, a measurement device 2, a peristaltic pump 5, a crystallization kettle 9, a dilution device and a solution storage tank 10, wherein a crystal-containing solution is arranged in the crystallization kettle 9; an inner wall of the solution amplifier 1 is smooth, one end is an amplification end, and the other end is a contraction end; identical through holes are formed in middle parts of both ends of the solution amplifier 1, and the solution amplifier is communicated with a pipeline 4 by the through holes;

the contraction end of the solution amplifier 1 is communicated with one end of the solution storage tank 10 and one end of the crystallization kettle 9 respectively; the amplification end of the solution amplifier 1 is communicated with the dilution device and the peristaltic pump 5 respectively; the peristaltic pump 5 is communicated with the other end of the crystallization kettle 9; the solution amplifier 1, the peristaltic pump 5 and the crystallization kettle 9 form a complete passage through a pipeline 4; a measurement instrument of the measurement device 2 is arranged at the outer side of the solution amplifier 1 and focuses on the solution in the amplification end of the solution amplifier 1; and at least one stop valve is mounted on each branch of the pipeline 4.

The amplification end of the solution amplifier 1 is of a cylindrical structure, and the contraction end of the solution amplifier 1 is of a funnel structure; a transition from the amplification end to the contraction end of the solution amplifier 1 is smooth; a cross section of a small end of the contraction end of the solution amplifier 1 is identical to a cross section of the through hole.

A constant-temperature tank 3 in a shape suitable for the solution amplifier is arranged at the outer side of the solution amplifier 1; a constant temperature in the constant-temperature tank 3 is maintained at a level not higher than the temperature in the crystallization kettle 9; the solution amplifier 1 is made of a high-transmittance material; the solution amplifier 1 is made of a high-transmittance material; and the constant-temperature tank 3 is made of a high-transmittance material or provided with a high-transmittance window.

A thermal insulation layer is arranged at the outer side of the pipeline 4; both a feeding end and a discharging end of the pipeline 4 are immersed into the crystal-containing solution; and the inner wall of the pipeline 4 is smooth.

A stirrer 7 and a temperature sensor 8 are also inserted onto the crystallization kettle 9; one end of the stirrer 7 and one end of the temperature sensor 8 are immersed in the crystal-containing solution, and the other end of the stirrer and the other end of the temperature sensor extend from an inner cavity of the crystallization kettle 9.

The measurement device 2 also includes a master control center 6, wherein the master control center 6 is electrically connected with the measurement instrument, stirrer 7 and temperature sensor 8 respectively.

The measurement instrument includes, but is not limited to, an online image system and a laser particle size analyzer.

The dilution device includes a mixer 11 a diluent storage tank 12 and a driving pump 13, wherein the mixer 11 is mounted on the pipeline 4 between the amplification end of the solution amplifier 1 and the peristaltic pump 5 and successively communicated with the driving pump 13 and the diluent storage tank through the pipeline 4.

Diluent in the diluent storage tank 12 is a solution different from the crystal or the same saturated solution as the crystal-containing solution; and the mixer 11 is a static mixer.

The solid content of the crystal-containing solution after being mixed by the mixer is not higher than 10%.

The specific implementation steps of the present invention are as follows: the crystalline solution is mixed evenly in the crystallization kettle 9 under the action of the stirrer 7, then the crystal-containing solution is transported by the peristaltic pump 5 to the mixer 11 via the pipeline 4. In the mixer 11, the high-solid-content crystalline solution is mixed with the diluent transported from the diluent storage tank 12 via the driving pump 13, then delivered to the solution amplifier 1 placed in the constant-temperature tank 3 via the pipeline 4; at this time, collection of crystal shape and size distribution information is performed on the solution amplifier 1 through the measurement instrument, and the collected information is transmitted to the master control center 6 for online image processing to obtain the crystal shape and size distribution information; and the solution in the solution amplifier 1 returns to the crystallization kettle 9 via the pipeline 4 or directly enters the solution storage tank 10.

In one embodiment of the present invention, as shown in FIG. 1, a stop valve v1 is arranged between the driving pump 13 and the mixer 11, and a stop valve v2 is arranged between the peristaltic pump 5 and the mixer 11; a stop valve v3 and a stop valve v4 are arranged respectively at the contraction end of the solution amplifier 1 and at a branch where the crystallization kettle 9 is communicated with the solution storage tank 10; a stop valve v5 is arranged at the other end of the solution storage tank 10.

Figure 2:
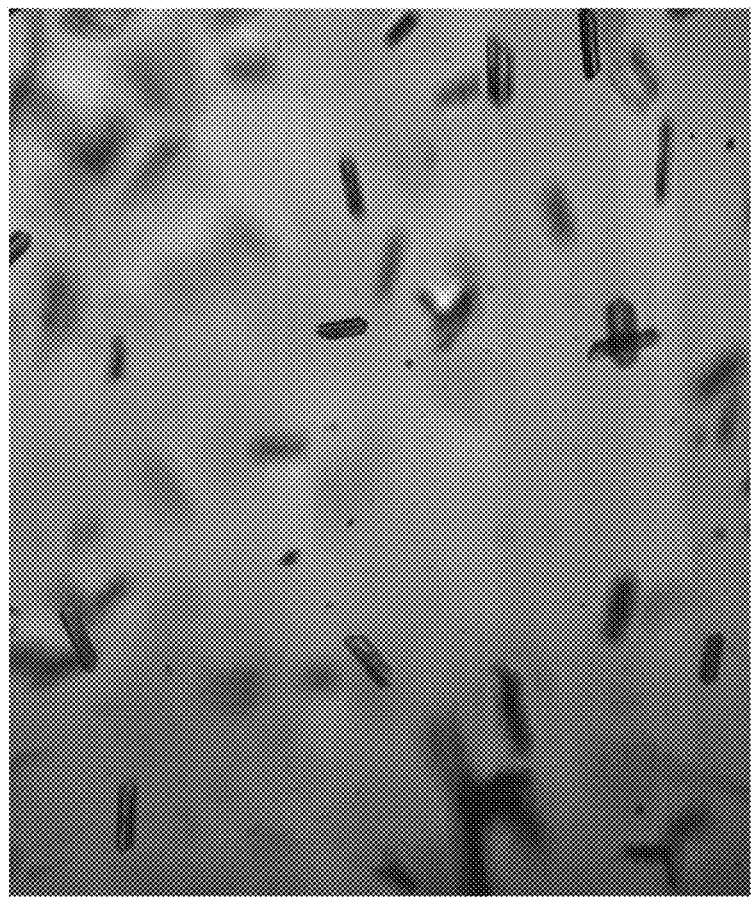
FIG. 2 is an image view of example 1 of the present invention.
Figure 3:
FIG. 3 is an image view of example 2 of the present invention.
Figure 4:
FIG. 4 is an image view of example 3 of the present invention.

In the embodiments of the present invention, as shown in FIG. 2-FIG. 4:

Example 1: L-glutamic acid-water intermittent cooling crystallization process was as follows: 3 L of crystalline solution was placed in a 4 L crystallization kettle at a solution temperature of 50° C., and stirring rate of 250 rpm. The crystalline solution had an average crystal size of 80-150 µm and solid content of 10%. The peristaltic pump was a Masterflex L/S peristaltic pump, and the pipeline was made of latex, with an inner diameter of 3.2 mm and a wall thickness of 1.6 mm; thermal insulation was realized through insulated cotton; the solution amplifier was made of glass with good transmittance. The constant-temperature tank was made of glass, and the heating solution was water maintained at 52° C.; a camera and a light source of the online image system were respectively arranged at the opposite sides of the solution amplifier and aligned with the inside of the constant-temperature tank, and the light source and camera focused in the solution amplifier. The sharpness of the image system was adjusted, the flow rate of the crystal in the solution was controlled through the peristaltic pump, and this process was carried out at about 100 rpm; image acquisition was performed on the circulating crystal solution in the solution amplifier. The measurement results are shown in FIG. 2.

Example 2: L-glutamic acid-water intermittent cooling crystallization process was as follows: 7 L of crystalline solution was placed in a 10 L crystallization kettle at a solution temperature of 50° C. and stirring rate of 150 rpm. The crystalline solution had an average crystal size 150-200 µm and solid content of 20%. The peristaltic pump was a Masterflex L/S peristaltic pump, and the pipeline was made of latex, with an inner diameter of 4.8 mm and a wall thickness of 1.6 mm; thermal insulation was realized through insulated cotton; the solution amplifier was made of glass with good transmittance. The constant-temperature tank was made of glass, and the heating solution was water maintained at 52° C.; a camera and a light source of the online image system were respectively arranged at the opposite sides of the solution amplifier and aligned with the inside of the constant-temperature tank, and the light source and camera focused in the solution amplifier. The sharpness of the image system was adjusted, the flow rate of the crystal in the solution was controlled through the peristaltic pump, and this process was carried out at about 100 rpm; image acquisition was performed on the circulating crystal solution in the solution amplifier. The measurement results are shown in FIG. 3.

Example 3: Potassium dihydrogen phosphate (KDP) intermittent cooling crystallization process was as follows: 3 L of crystalline solution was placed in a 4 L crystallization kettle at a solution temperature of 50° C. and stirring rate of 250 rpm. The crystalline solution had an average crystal size of 100-200 µm and solid content of 15%. The peristaltic pump was a Masterflex L/S peristaltic pump, and the pipeline was made of latex, with an inner diameter of 3.2 mm and a wall thickness of 1.6 mm; thermal insulation was realized through insulated cotton; the solution amplifier was made of glass with good transmittance. The constant-temperature tank was made of glass, and the heating solution was water maintained at 51° C.; a camera and a light source of the online image system were respectively arranged at the opposite sides of the solution amplifier and aligned with the inside of the constant-temperature tank, and the light source and camera focused in the solution amplifier. The sharpness of the image system was adjusted, the flow rate of the crystal in the solution was controlled through the peristaltic pump, and this process was carried out at about 100 rpm; image acquisition was performed on the circulating crystal solution in the solution amplifier. The measurement results are shown in FIG. 4.

From the above-mentioned embodiments, it can be concluded that the device of the present invention can be used for clear and accurate online measurement of crystal-containing solutions with a solid content of higher than 10%, the measured structures are obvious, and the images are clear.

The present invention discloses the following technical effects: the present invention realizes the measurement of a crystalline solution with a solid content of higher than 10%, and overcomes the problem that it is difficult to measure a crystalline solution with a solid content of higher than 10% by the existing measurement methods; through the design of the pipeline thermal-insulation layer and the constant-temperature tank, the problem of pipeline blockage caused by solution crystallization on the pipe wall and crystal sedimentation are avoided, and the disturbing influence of solution temperature variations in the circulation pipeline on the crystallization system is greatly reduced; the device can not only measure the particle size distribution of a crystal online but also measure the crystal morphology; the present invention allows both continuous measurement and intermittent measurement; the present invention can not only realize the recycling of a crystalline solution, but also discharge a measured solution for storage.

As described herein, it should be understood that the orientational or positional relationships indicated by the terms "longitudinal", "transverse", "upper", "lower", "front", "rear", "left", "right", "vertical", "horizontal", "top", "bottom", "inner", "outer" and the like are those based on the illustration in the drawings, which is only for the convenience of describing the present invention, rather than indicating or implying that the device or element referred to must have a specific orientation or be constructed and operated in a specific orientation, so it cannot be understood as a limitation to the present invention.

The embodiments described above only describe the preferred embodiments of the present invention, rather than limiting the scope of the present invention, and various variations or improvements made for the technical solution of the present invention by those of ordinary skill in the art should fall within the protection scope determined by the claims of the present invention without departing from the design spirit of the present invention.

What is claimed is:

1. An online measurement device for crystal size and shape in a high-solid-content crystallization process, comprising: a solution amplifier, a measurement device, a peristaltic pump, a crystallization kettle, a dilution device, and a solution storage tank, wherein a crystal-containing solution is arranged in the crystallization kettle; wherein an inner wall of the solution amplifier is smooth, a first end of the solution amplifier is an amplification end, and a second end of the solution amplifier is a contraction end; wherein identical through holes are formed in middle parts of both the first end and the second end of the solution amplifier, and the solution amplifier is communicated with a pipeline by the identical through holes;

wherein the contraction end of the solution amplifier is communicated with a first end of the solution storage tank and a first end of the crystallization kettle; wherein the amplification end of the solution amplifier is communicated with the dilution device and the peristaltic pump; wherein the peristaltic pump is communicated with a second end of the crystallization kettle; wherein the solution amplifier, the peristaltic pump and the crystallization kettle form a complete passage through a pipeline; wherein a measurement instrument of the measurement device is arranged at an outer side of the solution amplifier and focuses on a solution in the amplification end of the solution amplifier; and wherein at least one stop valve is mounted on each branch of the pipeline.

2. The online measurement device for crystal size and shape in the high-solid-content crystallization process of claim 1, wherein the amplification end of the solution amplifier is of a cylindrical structure, and the contraction end of the solution amplifier is of a funnel structure; wherein a transition from the amplification end to the contraction end of the solution amplifier is smooth; and wherein a cross section of a small end of the contraction end of the solution amplifier is identical to a cross section of the identical through hole.

3. The online measurement device for crystal size and shape in the high-solid-content crystallization process of claim 2, wherein a constant-temperature tank in a shape suitable for the solution amplifier is arranged at the outer side of the solution amplifier; wherein a constant temperature in the constant-temperature tank is maintained at a level not higher than a temperature in the crystallization kettle; wherein the solution amplifier is made of a first high-transmittance material; and wherein the constant-temperature tank is made of a second high-transmittance material or provided with a high-transmittance window.

4. The online measurement device for crystal size and shape in the high-solid-content crystallization process of claim 1, wherein a thermal insulation layer is arranged at the outer side of the pipeline; wherein both a feeding end and a discharging end of the pipeline are immersed into the crystal-containing solution; and wherein an inner wall of the pipeline is smooth.

5. The online measurement device for crystal size and shape in the high-solid-content crystallization process of claim 1, wherein a stirrer and a temperature sensor are arranged inside the crystallization kettle; wherein a first end of the stirrer and a first end of the temperature sensor are immersed in the crystal-containing solution, and a second end of the stirrer and a second end of the temperature sensor extend from an inner cavity of the crystallization kettle.

6. The online measurement device for crystal size and shape in the high-solid-content crystallization process of claim 5, wherein the measurement device also comprises a master control center, and wherein the master control center is electrically connected with the measurement instrument, stirrer and temperature sensor.

7. The online measurement device for crystal size and shape in a high-solid-content crystallization process of claim 1, wherein the online measurement instrument further comprises an online image system and a laser particle size analyzer.

8. The online measurement device for crystal size and shape in the high-solid-content crystallization process of claim 1, wherein the dilution device comprises a mixer, a diluent storage tank, and a driving pump, wherein the mixer is mounted on the pipeline between the amplification end of the solution amplifier and the peristaltic pump, and is communicated with the driving pump and the diluent storage tank through the pipeline.

9. The online measurement device for crystal size and shape in the high-solid-content crystallization process of claim 8, wherein the diluent storage tank comprises a diluent, wherein the diluent is a solution different from a crystal or same as a saturated solution in the crystal-containing solution; and wherein the mixer is a static mixer.

10. The online measurement device for crystal size and shape in the high-solid-content crystallization process of claim 1, wherein the crystal-containing solution after being mixed by the mixer has a solid content that is not higher than 10%.

* * * * *